United States Patent
Drouet et al.

(10) Patent No.: US 7,308,321 B2
(45) Date of Patent: Dec. 11, 2007

(54) SYSTEM, METHOD AND PROGRAM PRODUCT FOR HOUSE AUTOMATION

(75) Inventors: Francois-Xavier Drouet, La Gaude (FR); Olivier Rousseau, Vence (FR); Carole Truntschka, Saint-Laurent-du-Var (FR)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 11/257,290

(22) Filed: Oct. 24, 2005

(65) Prior Publication Data
US 2006/0089727 A1    Apr. 27, 2006

(30) Foreign Application Priority Data
Oct. 26, 2004   (EP)   .................................. 04300729
Aug. 31, 2005   (EP)   .................................. 05107946

(51) Int. Cl.
*G05D 23/00*   (2006.01)

(52) U.S. Cl. ........................ 700/20; 700/275; 700/276
(58) Field of Classification Search ................. 700/17, 700/19, 20, 275, 276
See application file for complete search history.

(56) References Cited

U.S. PATENT DOCUMENTS

| | | | |
|---|---|---|---|
| 6,604,023 B1* | 8/2003 | Brown et al. | 700/276 |
| 6,622,115 B1* | 9/2003 | Brown et al. | 702/183 |
| 7,136,709 B2* | 11/2006 | Arling et al. | 700/65 |
| 7,181,293 B2* | 2/2007 | Rothman et al. | 700/22 |
| 2007/0055390 A1* | 3/2007 | Simon et al. | 700/19 |

* cited by examiner

*Primary Examiner*—Leo Picard
*Assistant Examiner*—Douglas S Lee
(74) *Attorney, Agent, or Firm*—Douglas A. Lashmit; Hoffman, Warnick & D'Alessandro LLC

(57) ABSTRACT

A home environment managing method and system to manage home environment values from a plurality of locations is disclosed. The method allows in an acquisition mode to acquire through a Universal Remote Console a plurality of reference sets of home environment values from the plurality of locations. Each of the plurality of reference sets of home environment values are converted into a normalized set using a respective translation algorithm. Each normalized set is stored with a link to the translation algorithm used during the conversion. Furthermore, in a restore mode, a normalized set of home environment values is converted into a reference set using the translation algorithm linked to it, and then the reference set is restore to the appropriate location through a Universal Remote Console.

20 Claims, 9 Drawing Sheets

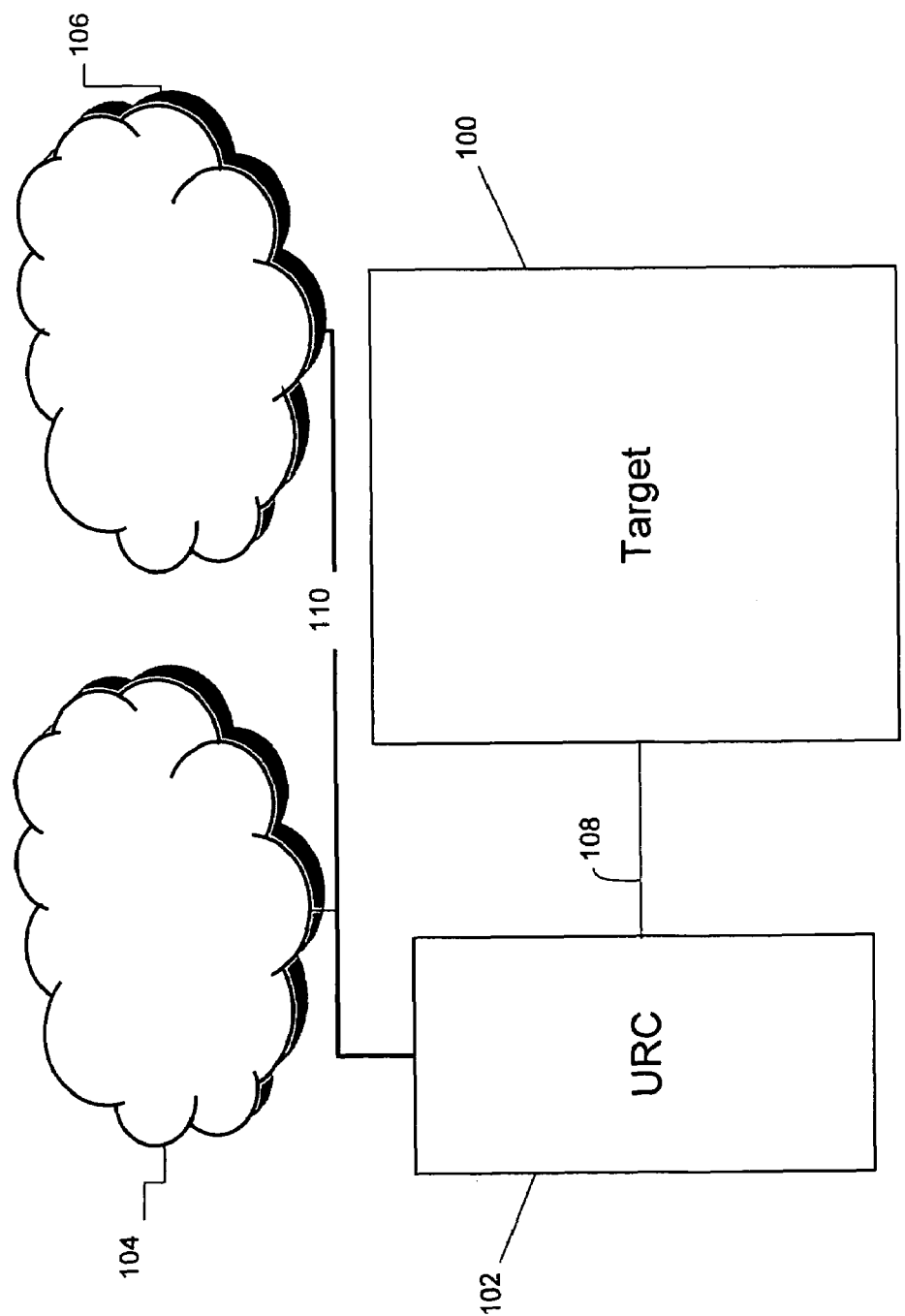
Figure 1-a

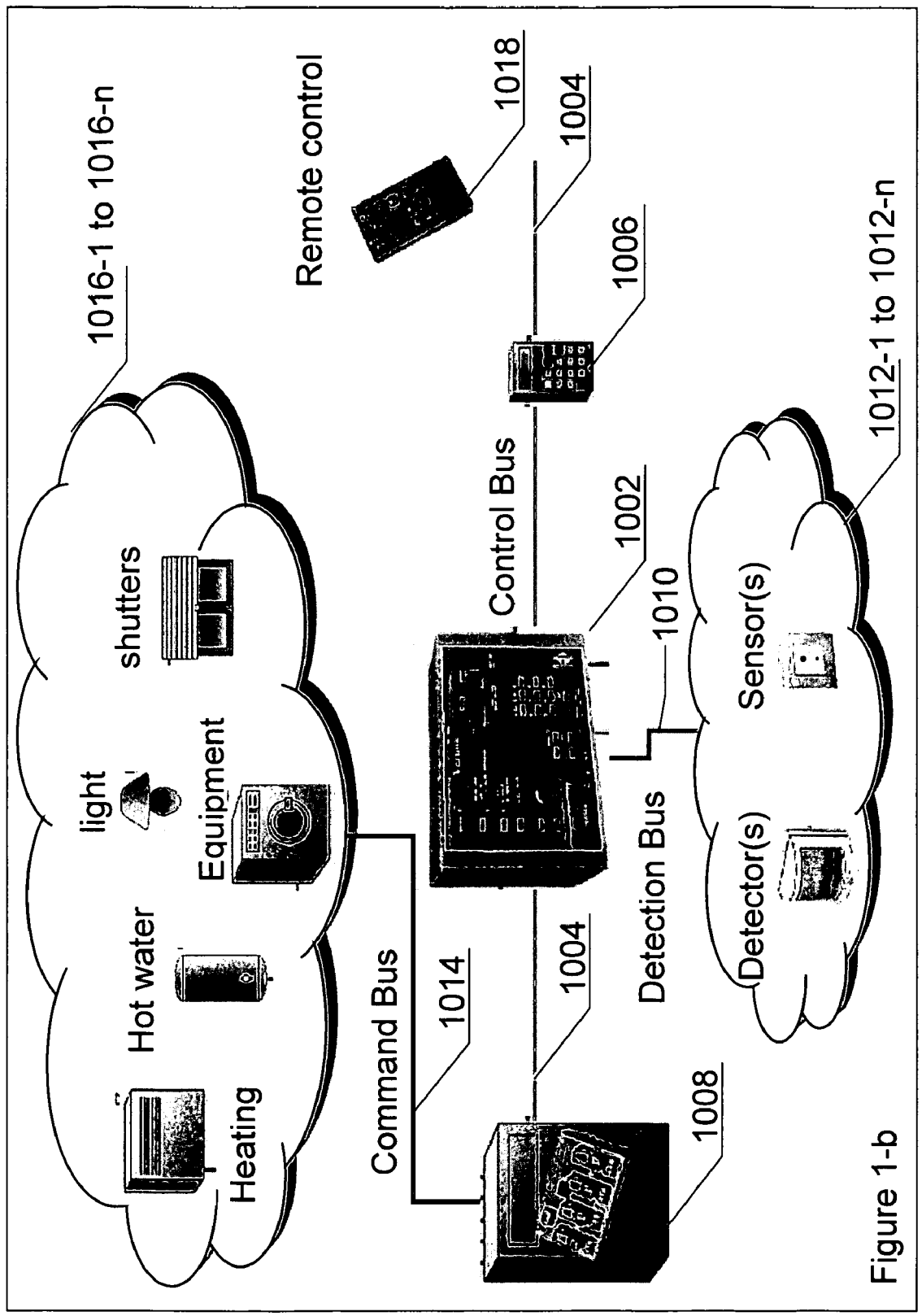
Figure 1-b

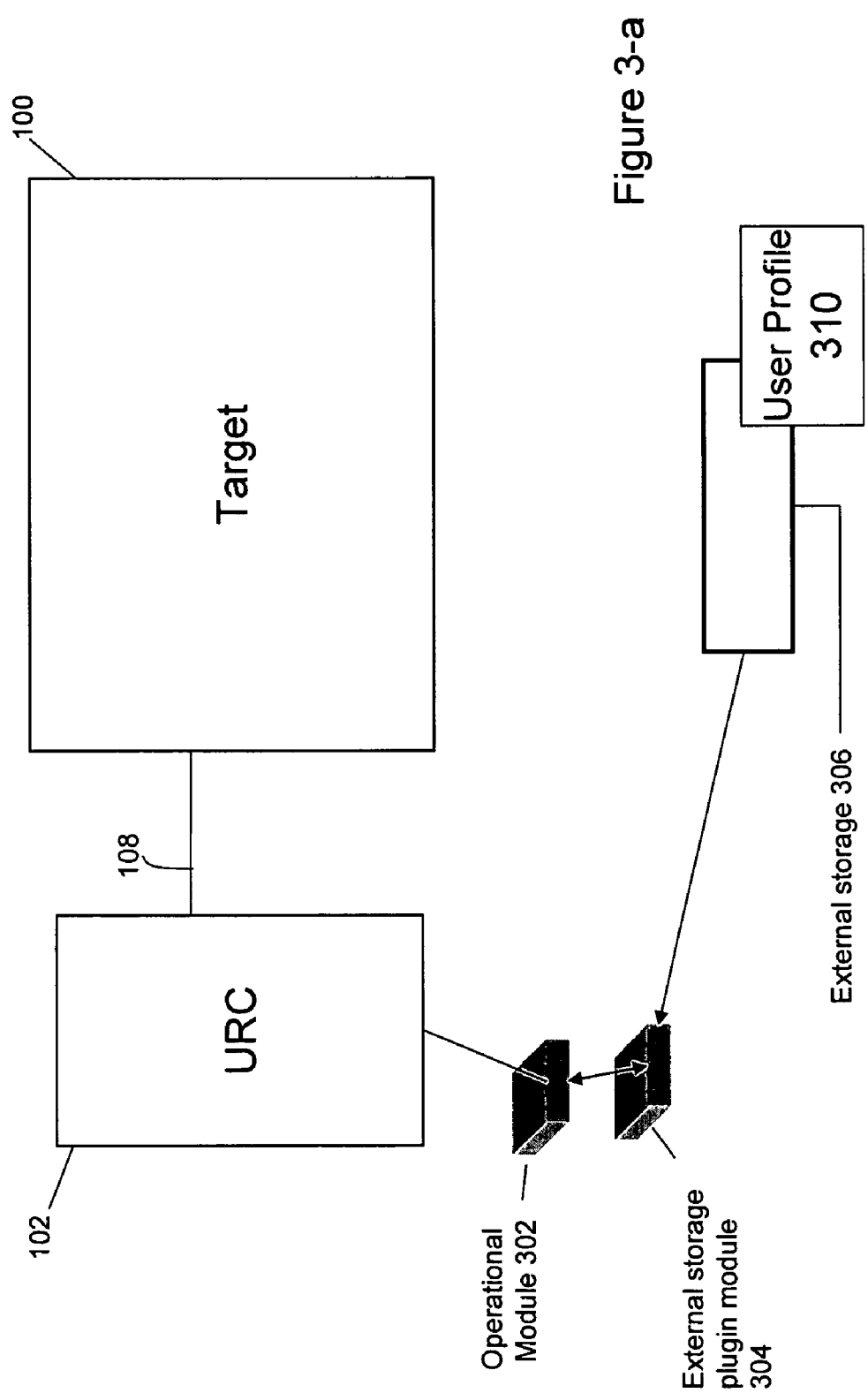

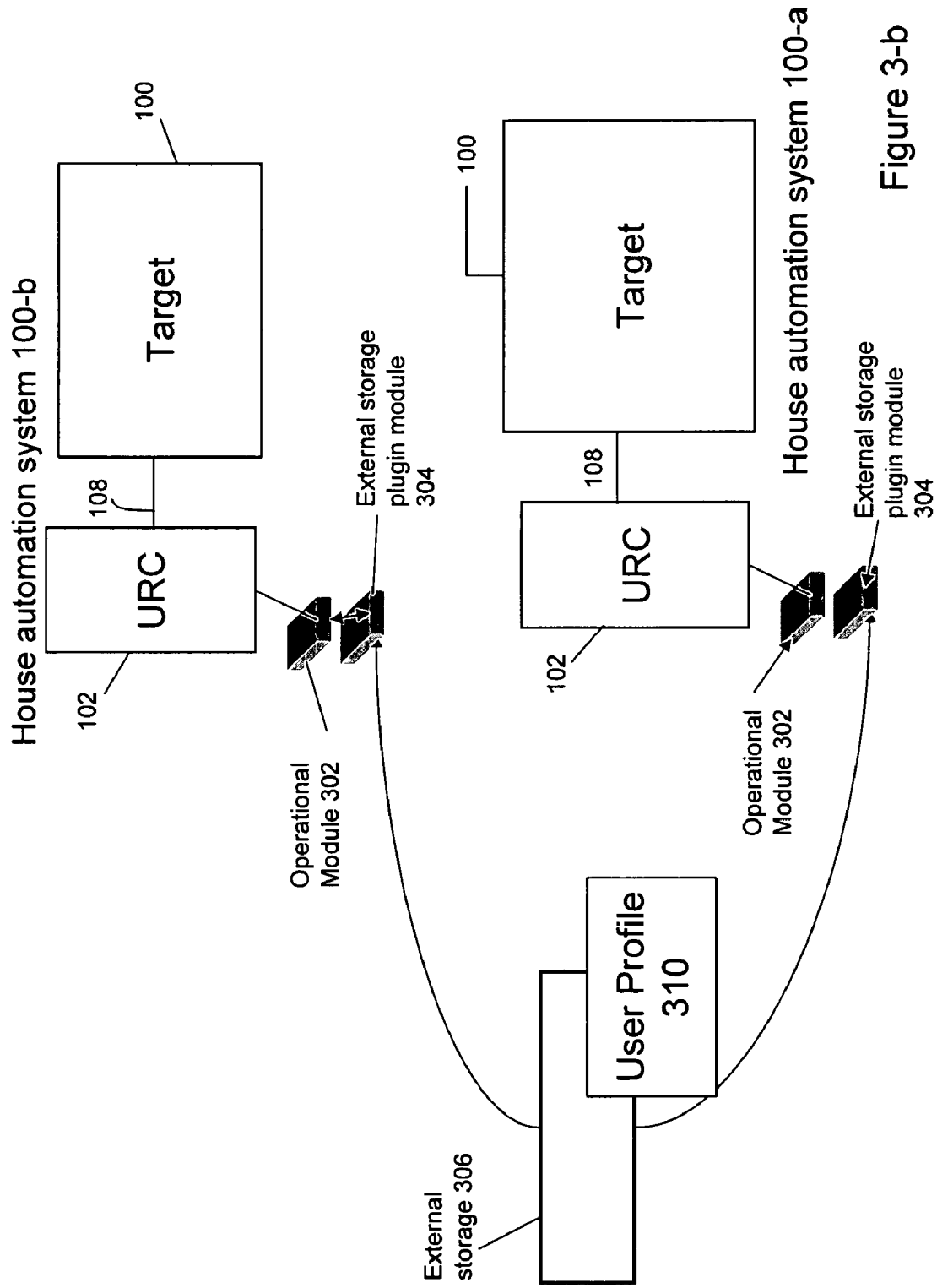
Figure 3-b

SYSTEM, METHOD AND PROGRAM PRODUCT FOR HOUSE AUTOMATION

TECHNICAL FIELD

The present invention relates in general to a system, method and program product for home environment management. More particularly, the present invention relates to a system, method and program product for improving the management of user profiles with related settings for home environment management.

BACKGROUND ART

Computer automation has proliferated to peoples' houses, with house automation, or home environment management.

One gathers under the name house automation, the whole of electronic technologies, data processing and telecommunication used in the houses.

House automation aims at ensuring the functions of safety, comfort, and monitoring of energy and communications, which one can find in the house.

The various apparatuses of a house are integrated within the home environment management systems which communicate between themselves in order to manage the automation. Some electronic devices make measurements of environment variables, such as temperature, wind speed, and so on. These measurements are used by the home environment management system in order to manage the same or other electronic devices in order to match a user command.

These systems can store one user setting in a user profile and then manage electronic devices for a user that selects this specific profile.

While this technology benefits a user of a specific system, it becomes useless in the situation where the user is traveling, thereby using several different home environment management systems.

Even if attempts have been made to provide a means to carry user profiles for other home environment management systems, a limitation is that a user profile is specific for a home environment management system company or model, and cannot be used for another one.

The following patents illustrate methods and systems for managing measurements in an environment utilizing a portable data processing system.

U.S. Pat. No. 6,604,023 to Brown discloses a method, system and program for managing an environment utilizing a portable data processing system. The portable data processing system can retrieve environmental indicators for a particular environment, and analyze each indicator according to an environment sensitivity profile.

While this technology helps a user to store collected values and helps the user to perform analysis on data collected by specific systems, it becomes useless in those situations where the user is traveling.

U.S. Pat. No. 6,622,115 to Brown discloses a method, system and program for managing a particular environment according to preferences stored on personal storage. This technology introduces the personal storage in the complete environment management system, but it becomes useless when the environment system is preexisting and is limited in the situation where the user is traveling, using several different home environment management systems.

Given the ever-increasing complexity of these ubiquitous environments, and the number of devices and services involved, new standards are arriving to enable this graceful integration. The V2 standard is one of these standards proposed by the technical committee of the International Committee for Information Technology Standards (www.incits.org) which is developing standards for Information Technology Access Interfaces. As part of this endeavor, V2 (www.v2access.org) is about to issue the Universal Remote Console (URC) architecture. The international standard for a Universal Remote Console (URC) is based on AIAP-URC (Alternative Interface Access Protocol—Universal Remote Console) which is a standard interconnection protocol that allows users to control mass-market devices/services (termed "targets").

In view of the foregoing, it appears desirable to offer a method, system and program product to automatically manage a set of normalized settings to be transferred to a home environment management system using a Universal Remote Console. The present invention offers such a solution.

SUMMARY OF THE INVENTION

It is an object of the invention to achieve a method and to provide a system for automatically adjusting user settings in any type of home environment management system, thereby allowing a user to travel from one location to another more easily.

Accordingly, the main object of the invention is a system implemented as a management module in a Universal Remote Console for acquiring normalized settings for a user of a home environment management system.

Another object of the invention is a system to retrieve reference values from the management module, translate the reference values to normalized settings using a translation module and store the reference values in a user profile on a mobile storage.

Yet another object of the invention is a system to retrieve on a mobile storage the normalized settings of a user profile and translate the normalized settings to reference values for use by a home environment management system.

Finally, another object of the invention is a system to store in a user profile a plurality of translation algorithms to convert normalized settings into reference values according to the home environment management system.

All objects, features and advantages of the present invention will become apparent in the following detailed description as well as in the appended claims.

According to an aspect of the present invention, a method is proposed for house automation. Particularly, a home environment managing method and system to manage home environment values from a plurality of locations is disclosed. The method allows in an acquisition mode to acquire through a Universal Remote Console a plurality of reference sets of home environment values from a plurality of locations. Each of the plurality of reference sets of home environment values are converted into a normalized set using a respective translation algorithm. Each normalized set is stored with a link to the translation algorithm used to convert a respective set of home environment values into the normalized set. Furthermore, in a restore mode, a normalized set of home environment values is converted into a reference set using the translation algorithm linked to it, and then the reference set is restored to the appropriate location through the Universal Remote Console.

In a commercial form, computer readable program means allowing a computer machine to perform the method according to the present invention are embodied on a program storage device that is readable by the computer machine.

BRIEF DESCRIPTION OF THE DRAWINGS

The above and other objects, features and advantages of the invention will be better understood by reading the following more particular description of the invention in conjunction with the accompanying drawings wherein:

FIG. 1-*a* illustrates the Universal Remote Control specification's structure and components;

FIG. 1-*b* is a general view of a house automation system;

FIG. 3-*a* is a general conceptual view of the system of the present invention;

FIG. 3-*b* is a diagram of a user carrying the external storage to different house automation systems;

DETAILED DESCRIPTION OF THE INVENTION

The Universal Remote Control specification's structure and components are illustrated in FIG. 1-*a*. As shown, the URC architecture is made up of four major components and two networks. The components include:

A target 100;

A URC 102;

A User Interface Implementation Description (UIID) 104; and resources 106.

The networks include a Target-URC Network (TUN) 108 and a Resource-URC Network (RUN) 110. The URC 102 is coupled to the target 100 via the TUN 108 to access available functions. A detailed view of target 100 is illustrated in FIG. 1-*b*. Target 100 is a house automation system and comprises a management unit 1002, connected via a control bus 1004 to a keyboard 1006 and to a remote management satellite 1008. The management unit 1002 is connected via a detection bus 1010 to a plurality of sensors and detectors (1012-1 to 1012-*n*).

The remote management satellite 1008, which in a preferred embodiment is implemented in the same box as the management unit 1002, is linked to house equipment (1016-1 to 1016-*n*) via a command bus 1014.

One skilled in the art will easily appreciate that the house equipment (1016-1 to 1016-*n*) could include heating systems, hot water systems, electronic equipment, shutters, lights, fans, etc.

One skilled in the art will also easily appreciate that the control bus 1004, the detection bus 1010 and the command bus 1014 could be implemented on a plurality of media (i.e., wire, wireless connection, infra-red connection, etc.).

An optional remote control unit 1018 could be implemented as part of the target 100.

Figure 2:
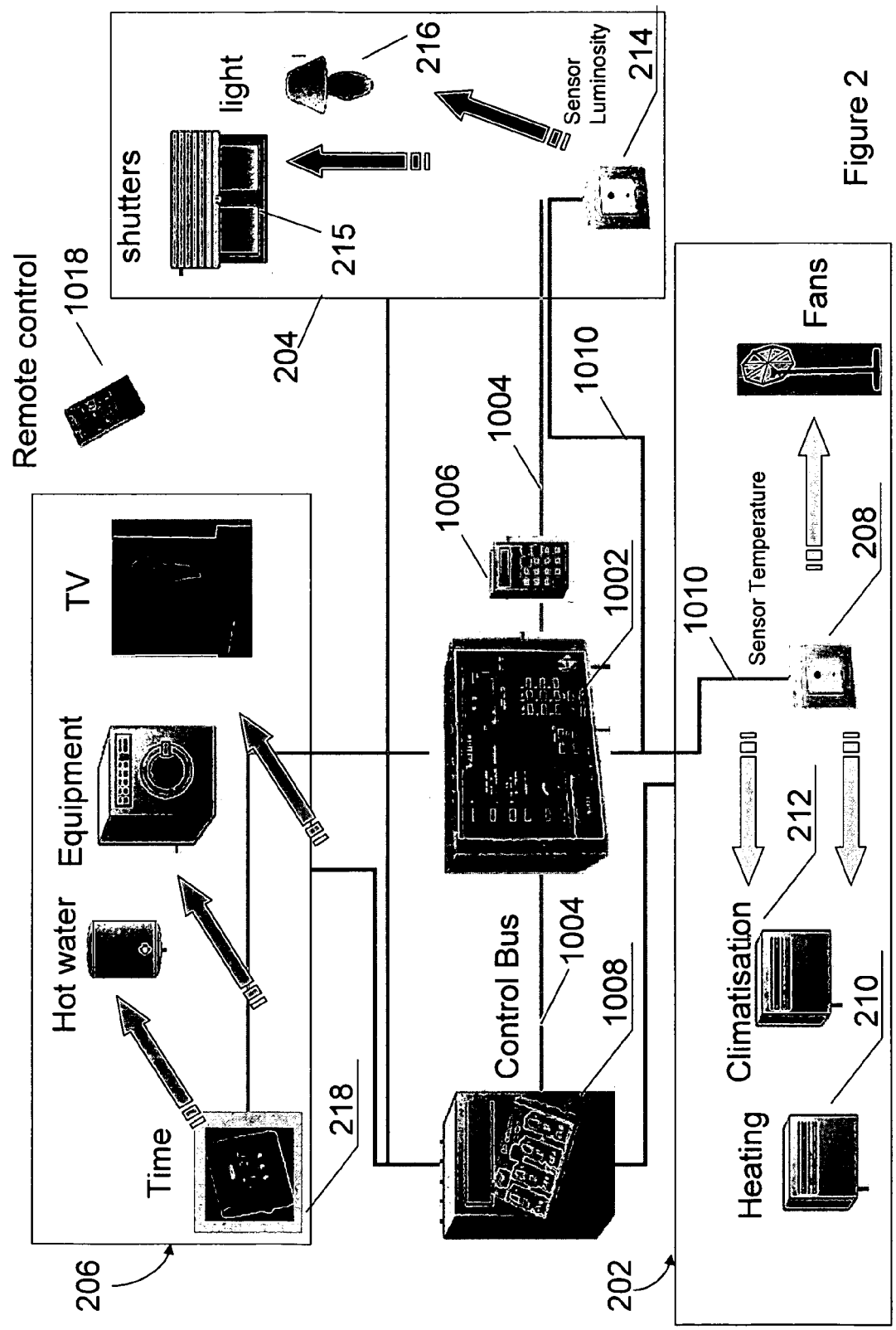
FIG. 2 illustrates a plurality of components being adjusted to specific settings.

Referring now to FIG. 2, a plurality of sample components are shown being adjusted to specific settings. Referring to the temperature management subsystem 202, for example, the management unit 1002 is connected via the detection bus 1010 to the temperature sensor 208 (part of the plurality of sensors and detectors (1012-1 to 1012-*n*)). A reference temperature was previously recorded on the management unit 1002, via its specific user interface. The temperature sensor 208 performs the measurement and reports the corresponding value to the management unit 1002. The command and actions to meet the reference temperature are calculated by the management unit 1002, transmitted via the control bus 1004 to the remote management satellite 1008, and the specific commands are sent to heating system 210 or the climatisation system 212 (part of the house equipment (1016-1 to 1016-*n*)).

Referring to the luminosity management subsystem 204, the management unit 1002 is connected via the detection bus 1010 to the luminosity sensor 214 (part of the plurality of sensors and detectors (1012-1 to 1012-*n*)). A reference light value was previously recorded on the management unit 1002, via its specific user interface. The luminosity sensor 214 performs the measurement and reports the corresponding value to the management unit 1002. The command and actions to meet the reference light value are calculated by the management unit 1002, transmitted via the control bus 1004 to the remote management satellite 1008 and the specific commands are send to the shutter system 215 or to light system 216 (part of the house equipment (1016-1 to 1016-*n*)).

Referring to the time managed management subsystem 206, the management unit 1002 is connected via the detection bus 1010 to the time unit 218 (part of the plurality of sensors and detectors (1012-1 to 1012-*n*)). The time unit 218 could also be integrated directly into the management unit 1002. A reference value was previously recorded on the management unit 1002, via its specific user interface, for each element of the plurality of house equipment to be managed by time. On clock detection by the management unit 1002, the command (Yes or No) is calculated by the management unit 1002, transmitted via the control bus 1004 to the remote management satellite 1008 and the specific electric command is sent to the related house equipment (1016-1 to 1016-*n*).

One skilled in the art will easily appreciate that a plurality of management subsystems as defined hereinbefore could be implemented as well.

Referring now to FIG. 3*a*, a general view of the system of the present invention is now described. The system includes as previously introduced a target 100 coupled to a URC 102 via a network 108. An operational module 302 is connected directly to the URC 102 or alternatively (not shown) via a RUN 110. The operational module 302 allows in one mode the acquisition of reference values from target 100, then the translation of the reference values to normalized settings and the storage of the normalized settings into a user profile 310. The user profile may be part of an external storage 306 accessible via an external storage plugin module 304. In another mode, the operational module 302 allows the retrieval of normalized settings from a user profile of an external storage 306, and the translation of the normalized settings to reference values.

FIG. 3*b* is a diagram of a user carrying the external storage 306 from a first target house automation system 100-*a* (for example in a home) to a different model and type of target house automation system 100-*b* (for example in a hotel). The user may carry the external storage 306 to any of the house automation systems 100-*x*, in order to operate it to install the house with the user's user profile.

Figure 4:
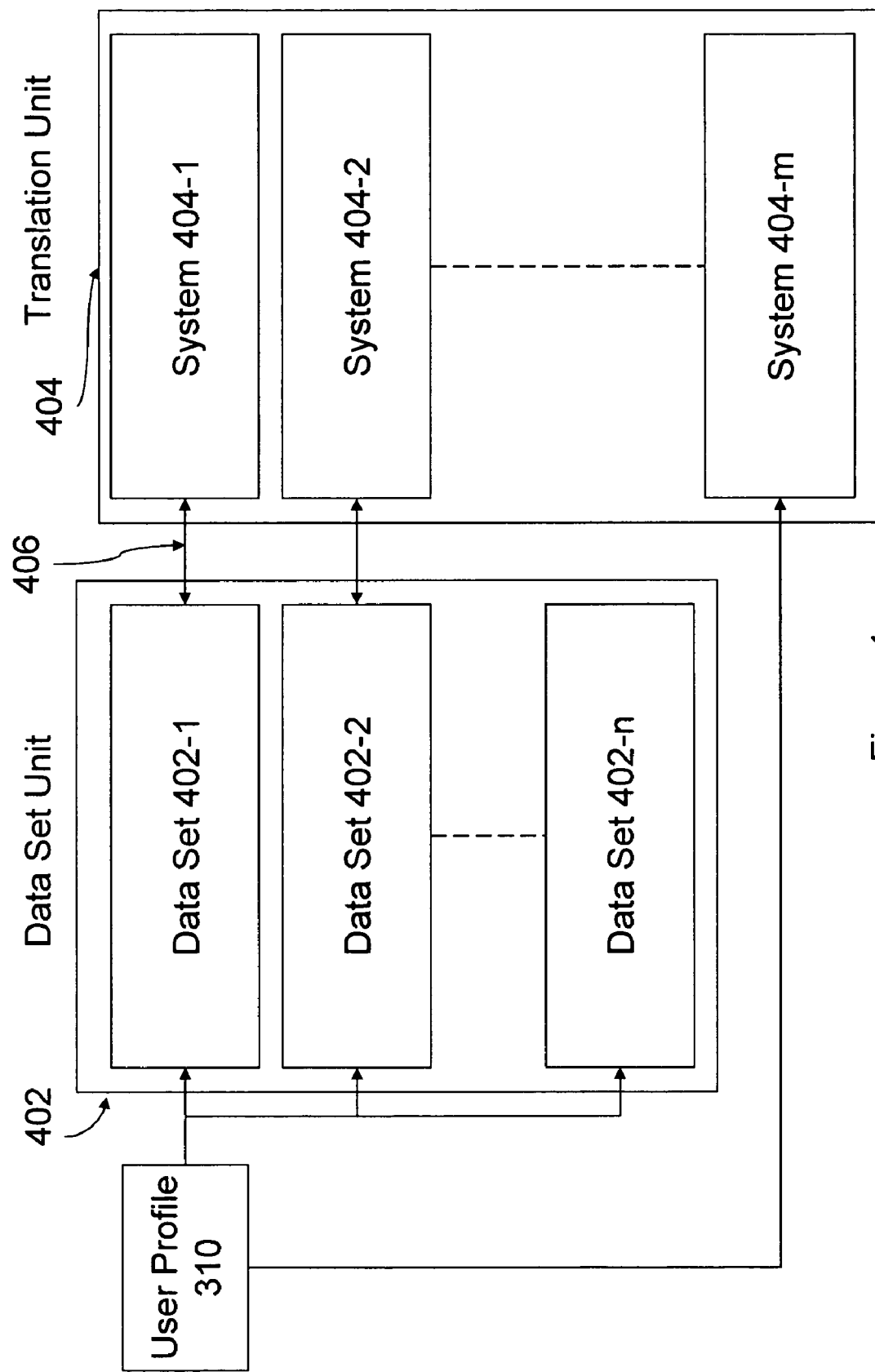
FIG. 4 is a diagram of a user profile as defined in the present invention.

Referring now to FIG. 4, a description of a user profile as defined in the present invention is made. The user profile 310 comprises a data set unit 402 made of a plurality of data set components (402-1 to 402-*n*) and a translation unit 404 made of a plurality of translation components (404-1 to 404-*m*). The operational module 302 or the external interface (refer to FIG. 7) operates to maintain or not (based on user choice) a link 406 between one data set component and one translation component.

Figure 5:
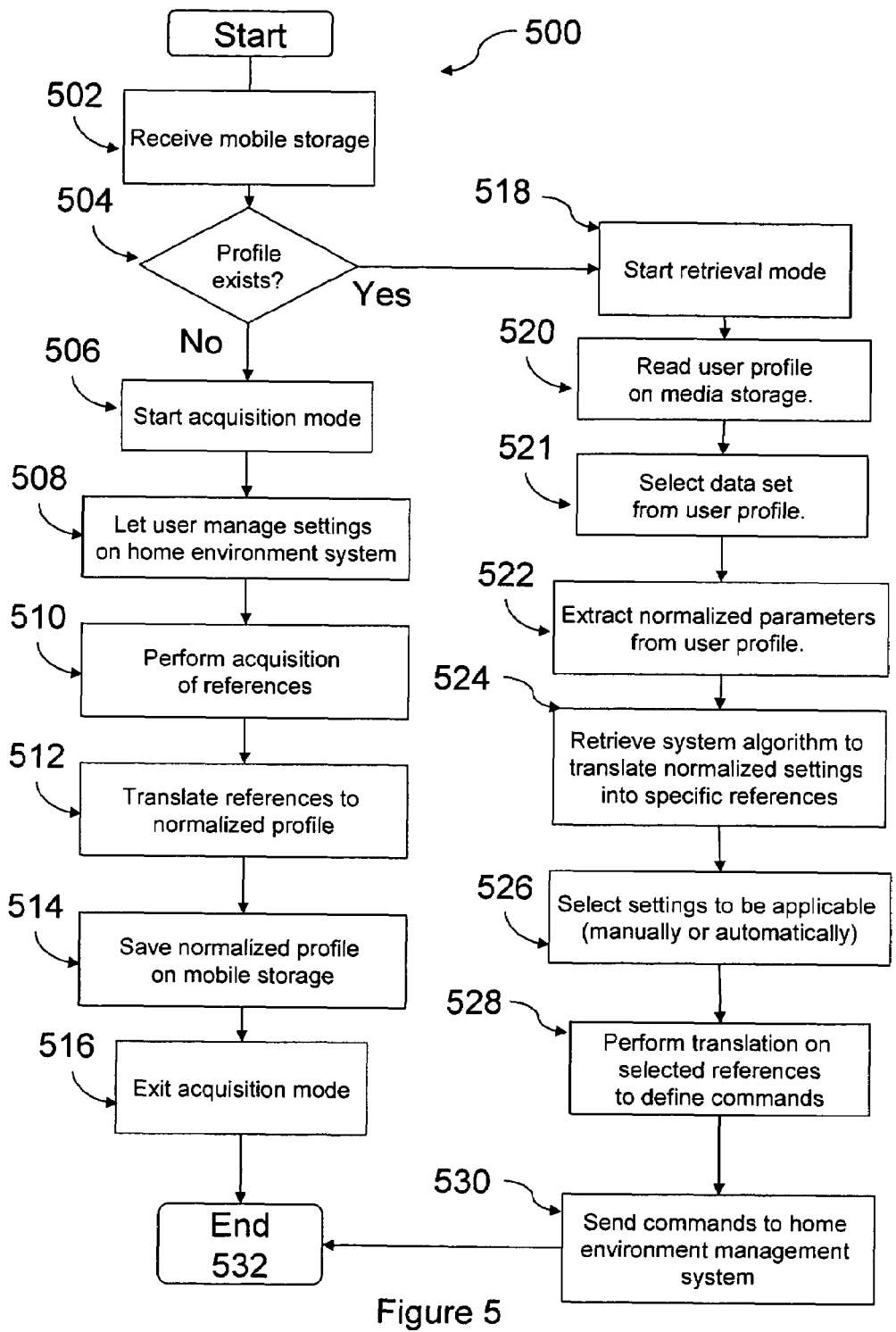
FIG. 5 is a flow chart of a user profile acquisition.

FIG. 5 depicts a high level flow chart for a user profile acquisition 500, enabling settings in different house automation systems. Processing starts when the external storage 306 is inserted into the external storage plugin module 304 (step 502). One skilled in the art will easily appreciate that the external storage 306 may be any mobile media capable of storing data, and that the external storage plugin module 304 is adapted to it (such as if the external storage 306 is a USB key, the external storage plugin module 304 is the USB port of the URC).

If a user profile 310 exists, process goes to step 518 where the retrieval of the user profile starts. On step 520, the user profile 310 is read from the external storage 306. On step 521, the user is asked to select the correct data set 402-$x$ of normalized settings to be applied. On step 522, the normalized settings are extracted. The translation component to be applied to the normalized settings is retrieved automatically from the translation unit 404 if a link 406 already exists in the user profile 310, otherwise the user is asked to select a translation component 404-$y$ in the user profile 310 on step 524. Then, on step 526, the process allows the user to select manually some normalized settings to be transmitted after the translation operation to the management unit 1002, or to use a preselected bundle of normalized settings already defined in the user profile 310.

Then on step 528, the process performs the translation of the normalized values to reference values based on information collected during steps 522, 524 and 526. The reference values are next sent to the management unit 1002 on step 530. The process then ends on step 532.

Going back to step 504, if the user profile 310 does not exist on the external storage 306, the process goes to step 506 to start the acquisition operation.

On next step 508, the user defines the elements of his user profile, i.e., a specific translation component or not, the reference values to be stored as normalized settings, and a preselected bundle of normalized settings.

On step 510, the process performs the acquisition of references values from the management module 1002. Then on step 512, the process performs the translation of those reference values to normalized settings, and saves on step 514 all preselected elements in the first data set component 402-1 of the user profile 310 on the external storage 306.

The process exits the acquisition mode on Step 516 and then ends on step 532.

Figure 6:
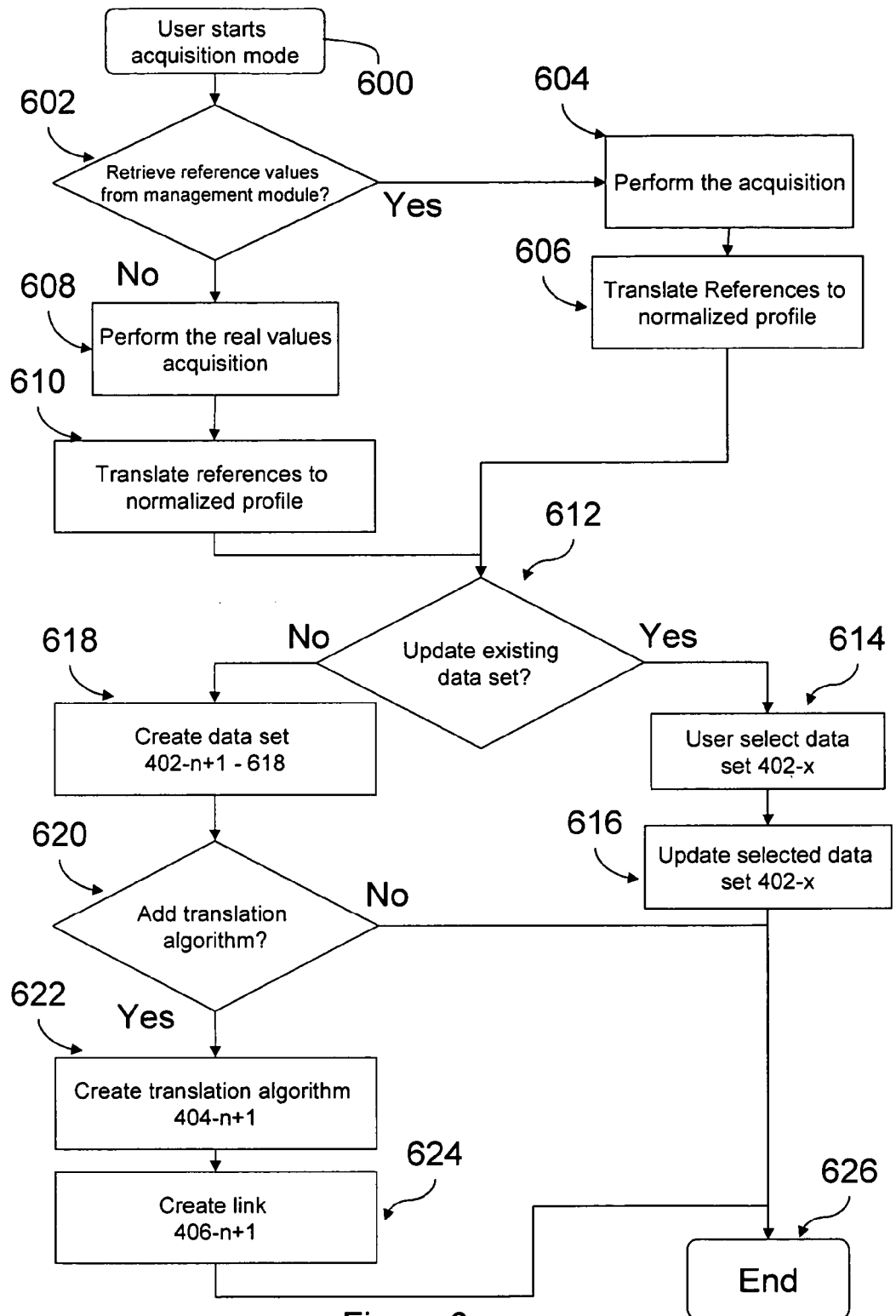
FIG. 6 is a flow chart of user profile normalized setting measurements.

Going to FIG. 6, a flow chart for a user profile normalized setting measurements is provided. On step 600, the user starts the acquisition mode on the operational module 302.

If the user mentions the retrieval of reference values from the management module 1002, the process goes to step 604. On step 604, the acquisition of reference values from the management module 1002 is performed. On step 606, the process performs the translation of those reference values to normalized settings.

If on step 602, the user mentions the retrieval of real values, the operational module 302 starts on step 608 the acquisition of real values using the sensors and detectors (1012-1 to 1012-$n$) through the management module 1002. The real values are then translated as normalized settings on step 610.

On step 612, the user is offered to update an existing data set component. If the user decides to update, the process goes to step 614, where the user selects the chosen data set 402-$x$ to be updated, and on step 616 the data set is updated. Then the process ends on step 626.

If on step 612 the user wants to create a new data set component, the process goes to step 618 where the new data set component (402-$n$+1) is created on the external storage 306 as part of the existing user profile 310. In this latter case, the value of 'n' corresponds to the last predefined data set component on the user profile 310.

If the user wants to store also a corresponding translation component on step 620, then the process goes to step 622 otherwise the process ends on step 626.

On step 622, a translation component (404-$n$+1) is created on the external storage 306 as part of the existing profile 310. On next step 624, a link (406-$n$+1) is created between the newly created translation component (404-$n$+1) and the new data set component (402-$n$+1). The process then ends on step 626.

Figure 7:
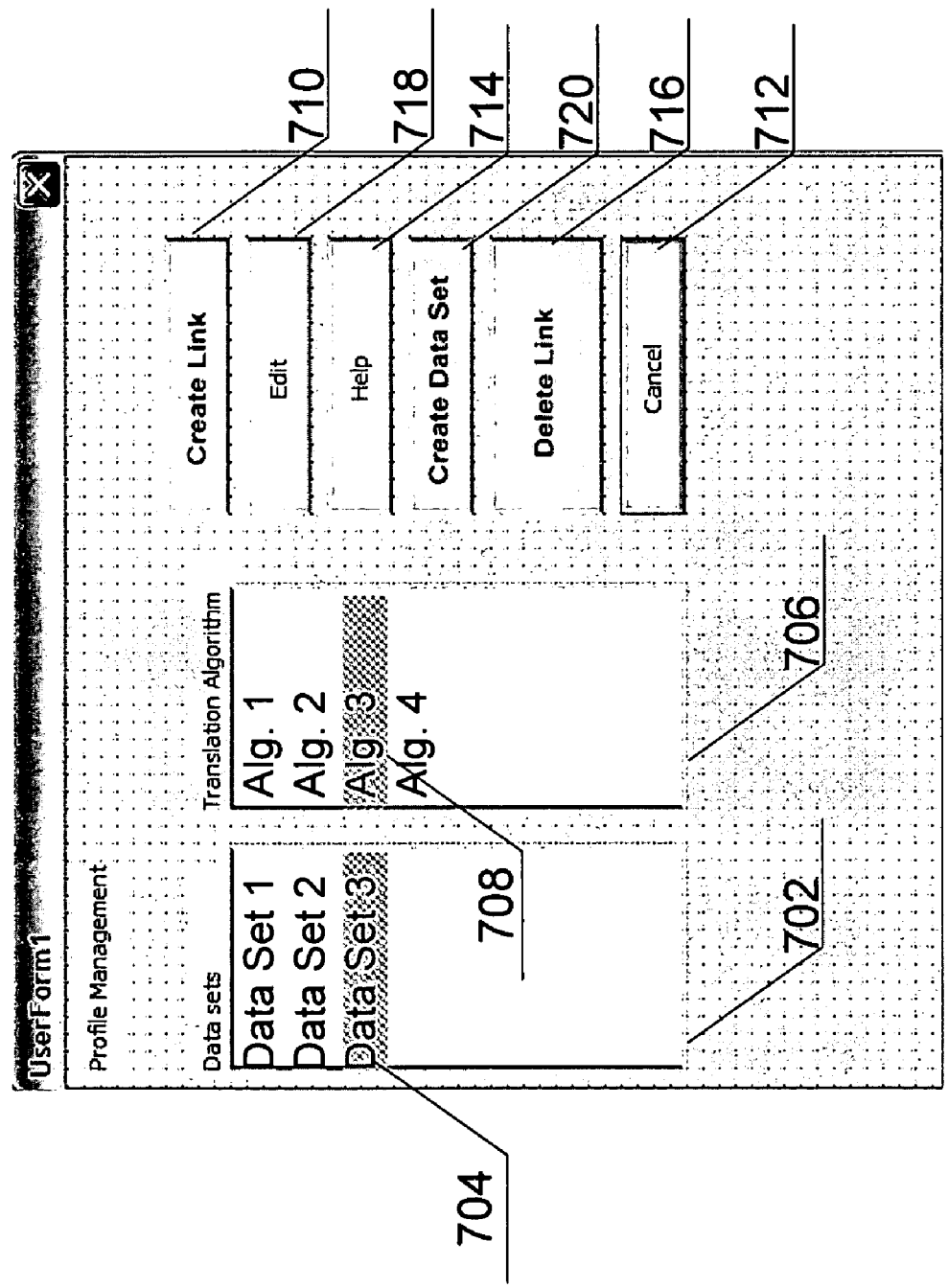
FIG. 7 is a pictorial representation of the user interface main window in a preferred embodiment.

FIG. 7 illustrates a preferred embodiment of the external interface main window as viewed by a user inserting the external storage 306 into a personal computer drive. The window includes a data set area 702 to display a list of data set components included in the user profile 310 present on the external storage 306. The user may select one data set 704 in this selection list 702.

The main window also includes a translation area 706 to list all the translation components available in the user profile 310 and to be linked to the data set components of the selection list 702. A translation component 708 that is selected in the selection list 706 by the user is the one which is linked to the data set component 704 selected by the user.

The main window also includes several push buttons. A link button 710 allows the user to create the link 406 between one data set component 402 and one translation component 404.

A cancel button 712 allows the user to cancel all current actions while maintaining the existing links that have been defined before the external interface starts.

The main window may also include a help button 714 to start a help process for the external interface.

Additionally, the window may include another push button 716 to delete an existing link 406 between a data set component and a translation component.

In another configuration where a user may use a 'create data set' push button 720 or may directly edit an existing data set 704 by using an 'edit' push button 718, an edit window is opened with a data set basic format with predefined normalized settings.

It is to be appreciated that various modifications may be made to the system and method herein described without departing from the spirit of the invention.

The invention claimed is:

1. A home environment managing system for managing home environment values for a plurality of house automation systems located at a plurality of different locations, the home environment managing system being coupled to each house automation system through a Universal Remote Console device, and comprising:

means for acquiring a plurality of reference sets of home environment values for a user from the plurality of house automation systems;

means for storing each of the plurality of reference sets in a normalized format, wherein the storing means can be carried by the user between the plurality of different locations;

means for restoring at least one reference set of home environment values for the user at at least one of the house automation systems; and translation means for converting each of the plurality of reference sets of home environment values into a normalized set in an acquisition mode and for converting a normalized set of home environment values into the at least one reference set in a restore mode;

wherein the user can apply, at any of the plurality of different locations, a respective reference set of home environment values stored in the storage means.

2. The system of claim 1 wherein the means for storing each of the plurality of reference sets further comprise means for replacing an existing reference set by a new one.

3. The system of claim 1 wherein the storing means is a universal serial bus (USB) key.

4. The system of claim 1 wherein each of the plurality of reference sets of home environment values is computed by a home electronic computing device.

5. The system of claim 4 wherein the home electronic device is coupled to sensing means.

6. The system of claim 4 wherein the home electronic device is coupled to detecting means.

7. The system of claim 1 wherein the Universal Remote Console is implemented as part of a portable data processing system.

8. The system of claim 7 wherein the portable data processing system is a computer device.

9. The system of claim 8 wherein the computer device is coupled to the plurality of locations through a network.

10. The system of claim 7 wherein the portable data processing device is a mobile telephone.

11. The system of claim 10 wherein the mobile telephone is coupled to the plurality of locations.

12. A home environment managing method to manage home environment values for a plurality of house automation systems located at a plurality of different locations, comprising: in an acquisition mode:

acquiring through a Universal Remote Console a plurality of reference sets of home environment values for a user from the plurality of house automation systems;

converting each of the plurality of reference sets of home environment values into a normalized set using a respective translation algorithm;

storing each of the normalized sets with a link to the corresponding translation algorithm in a storage unit that can be carried by the user between the plurality of different locations;

in a restore mode:

converting a normalized set of home environment values into a reference set using the translation algorithm linked to the reference set; and restoring through a Universal Remote Console the reference set of home environment values for the user to the appropriate house automation system;

wherein the user can apply a reference set of home environment values stored in the storage unit at any of the plurality of locations.

13. The method of claim 12 further comprising after the step of converting in the acquisition mode the step of replacing an existing reference set by a new one.

14. The method of claim 12 wherein each of the plurality of reference sets of home environment values is computed by a home electronic computing device.

15. The method of claim 12 wherein the Universal Remote Console is implemented as part of a portable data processing system.

16. The method of claim 15 wherein the portable data processing device is a computer device.

17. The method of claim 16 wherein the computer device is coupled to the plurality of locations through a network.

18. The method of claim 15 wherein the portable data processing device is a mobile telephone.

19. The method of claim 18 wherein the mobile telephone is coupled to the plurality of locations.

20. A computer program product stored on a medium readable by a computer machine, the computer program product tangibly embodying readable program means for causing the computer machine to perform the method according to claim 12.

* * * * *